(12) United States Patent
Huang et al.

(10) Patent No.: US 12,531,476 B2
(45) Date of Patent: Jan. 20, 2026

(54) SYSTEMS AND METHODS FOR HYBRID PHASE-SHIFT OPERATION OF INTERLEAVED PFC CONVERTERS

(71) Applicant: Navitas Semiconductor Limited, Dublin (IE)

(72) Inventors: Xiucheng Huang, Torrance, CA (US); Weijing Du, Torrance, CA (US); Yun Zhou, Shenzhen (CN)

(73) Assignee: Navitas Semiconductor Limited, Dublin (IE)

( * ) Notice: Subject to any disclaimer, the term of this patent is extended or adjusted under 35 U.S.C. 154(b) by 171 days.

(21) Appl. No.: 18/534,359

(22) Filed: Dec. 8, 2023

(65) Prior Publication Data

US 2024/0204655 A1   Jun. 20, 2024

(30) Foreign Application Priority Data

Dec. 16, 2022   (CN) .......................... 202211623223.4

(51) Int. Cl.
*H02M 1/42* (2007.01)
*H02M 1/00* (2006.01)

(52) U.S. Cl.
CPC ....... *H02M 1/4208* (2013.01); *H02M 1/0043* (2021.05)

(58) Field of Classification Search
CPC .... H02M 1/0043; H02M 1/42; H02M 1/4225; H02M 3/158; H02M 3/1586
See application file for complete search history.

(56) References Cited

U.S. PATENT DOCUMENTS

| | | | | |
|---|---|---|---|---|
| 8,659,276 B2* | 2/2014 | Skinner | ............... | H02M 3/1584 323/283 |
| 8,963,521 B2* | 2/2015 | Wei | ..................... | H02M 3/1584 323/272 |
| 10,090,765 B1* | 10/2018 | Kanzian | ............... | H02M 3/1588 |
| 2011/0291631 A1* | 12/2011 | Takahashi | ........... | H02M 3/1584 323/283 |
| 2019/0052169 A1* | 2/2019 | Bhandarkar | ........ | H02M 1/4225 |
| 2024/0429823 A1* | 12/2024 | Yang | ................... | H02M 3/1584 |

\* cited by examiner

*Primary Examiner* — Gary L Laxton
(74) *Attorney, Agent, or Firm* — FisherBroyles, LLP

(57) ABSTRACT

A method of operating a circuit is disclosed. The method includes providing an interleaved power factor correction (PFC) converter circuit; determining a switching frequency of the interleaved PFC converter circuit; setting a phase shift of the interleaved PFC converter circuit at a first phase shift when the switching frequency of the interleaved PFC converter circuit is below or at a first switching frequency; setting the phase shift of the interleaved PFC converter circuit at a second phase shift when the switching frequency of the interleaved PFC converter circuit is greater than the first switching frequency but less than a second switching frequency; and setting the phase shift of the interleaved PFC converter circuit at the first phase shift when the switching frequency of interleaved the PFC converter circuit is greater than the second switching frequency.

20 Claims, 6 Drawing Sheets

SYSTEMS AND METHODS FOR HYBRID PHASE-SHIFT OPERATION OF INTERLEAVED PFC CONVERTERS

CROSS-REFERENCE TO RELATED APPLICATIONS

The present application claims priority to Chinese Patent Application No. 202211623223.4, filed on Dec. 16, 2022, entitled "Method for Hybrid Phase-Shift Control of Interleaved PFC Converter", the contents of which are incorporated herein by reference in their entirety for all purposes.

FIELD

The described embodiments relate generally to power converters, and more particularly, the present embodiments relate to systems and methods for hybrid phase-shift control and operation of interleaved power factor correction (PFC) converters.

BACKGROUND

Electronic devices such as computers, servers and televisions, among others, employ one or more electrical power conversion circuits to convert one form of electrical energy to another. Some electrical power conversion circuits use switching power supplies such as a flyback converter. Switching power supplies can efficiently convert power from a source to a load. Switching power supplies may have relatively high power conversion efficiency, as compared to other types of power converters. Switching power supplies may also be substantially smaller and lighter than a linear supply due to the smaller transformer size and weight.

SUMMARY

In some embodiments, a method of operating a circuit is disclosed. The method includes providing an interleaved power factor correction (PFC) converter circuit; determining a switching frequency of the interleaved PFC converter circuit; setting a phase shift of the interleaved PFC converter circuit at a first phase shift when the switching frequency of the interleaved PFC converter circuit is below or at a first switching frequency; setting the phase shift of the interleaved PFC converter circuit at a second phase shift when the switching frequency of the interleaved PFC converter circuit is greater than the first switching frequency but less than a second switching frequency; and setting the phase shift of the interleaved PFC converter circuit at the first phase shift when the switching frequency of interleaved the PFC converter circuit is greater than the second switching frequency.

In some embodiments, the interleaved PFC converter circuit includes m channels that are coupled in parallel. In some embodiments, the m is equal to 2. In some embodiments, the method further includes determining the first switching frequency by dividing 150 kHz by m. In some embodiments, the method further includes determining the second switching frequency by dividing 150 kHz by m−1. In some embodiments, the method further includes determining the first phase shift by dividing 360° by m. In some embodiments, the method further includes determining the second phase shift by dividing 360° by m². In some embodiments, m is greater than 2. In some embodiments, the interleaved PFC converter circuit includes gallium nitride (GaN) based switches. In some embodiments, the interleaved PFC converter circuit includes silicon-based or silicon carbide based switches.

In some embodiments, a circuit is disclosed. The circuit includes an interleaved power factor correction (PFC) converter circuit, the interleaved PFC converter circuit arranged to: determine a switching frequency of the interleaved PFC converter circuit; set a phase shift of the interleaved PFC converter circuit at a first phase shift when the switching frequency of the interleaved PFC converter circuit is below or at a first switching frequency; set the phase shift of the interleaved PFC converter circuit at a second phase shift when the switching frequency of the interleaved PFC converter circuit is greater than the first switching frequency but less than a second switching frequency; and set the phase shift of the interleaved PFC converter circuit at the first phase shift when the switching frequency of interleaved the PFC converter circuit is greater than the second switching frequency.

DETAILED DESCRIPTION

Figure 1:
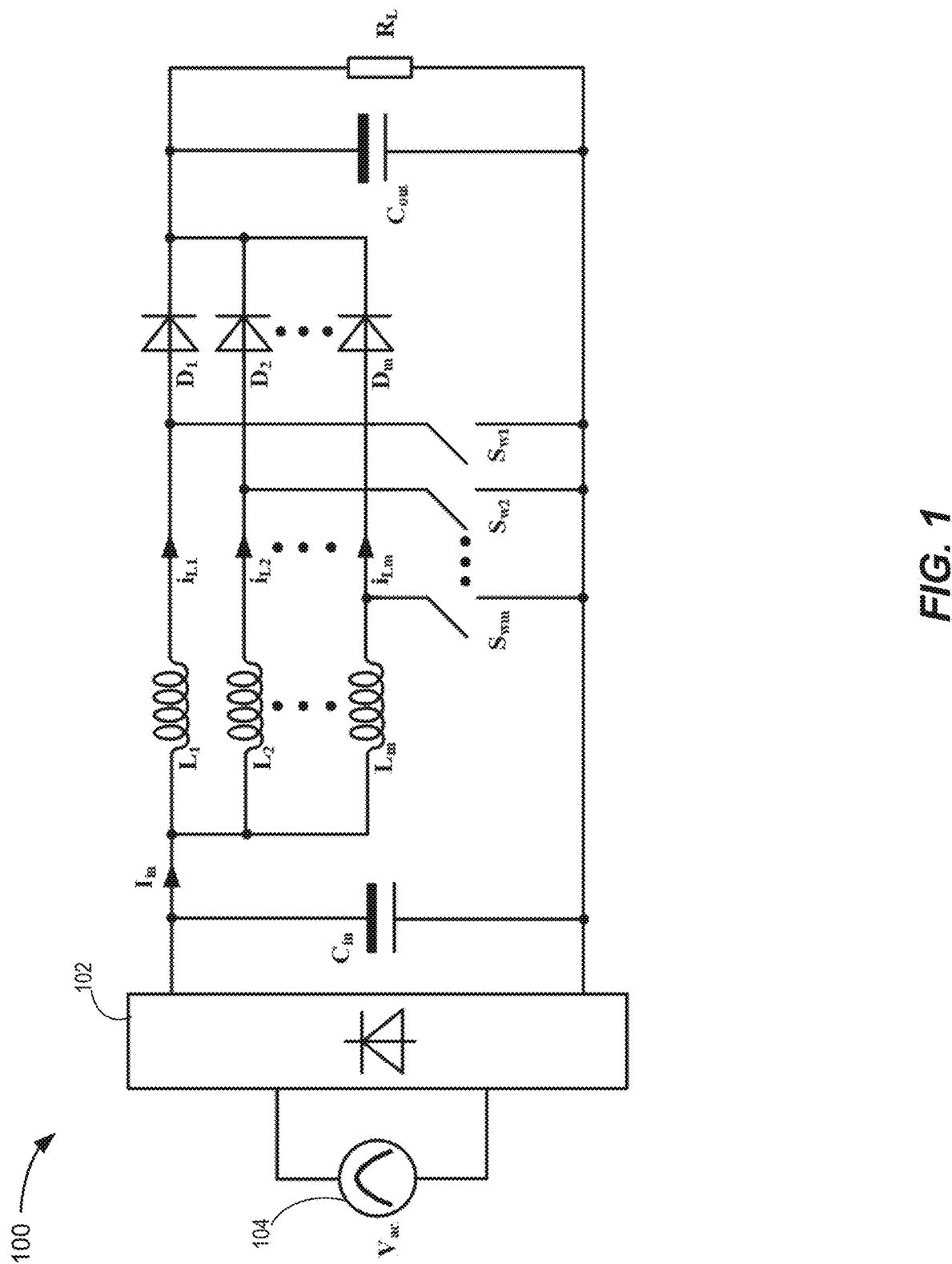
FIG. 1 shows a schematic of a multi-phase interleaved PFC converter controlled with hybrid phase-shift control method, according to some embodiments.

Circuits, devices and related techniques disclosed herein relate generally to power converters. More specifically, circuits, devices and related techniques disclosed herein relate to systems and methods for hybrid phase-shift control and operation of interleaved PFC converters to reduce electromagnetic interference (EMI) performance of the converter. In some embodiments, the phase-shift angle of the interleaved PFC converter can be changed when a switching frequency of input AC line changes. As the switching frequency of the interleaved PFC converter changes, its phase-shift angle θ may be set to different values. In various embodiments, the switching frequency $f_{sw}$ of the interleaved PFC converter can have two different frequency thresholds, i.e., a first switching frequency $f_{sw\_1}$ and a second switching frequency $f_{sw\_2}$.

In some embodiments, the phase-shift angle θ may be set at a first phase-shift angle $θ_A$ when the switching frequency of the interleaved PFC converter circuit is below or at a first switching frequency $f_{sw\_1}$. The phase-shift angle θ may be set at a second phase-shift angle $θ_B$ when the switching frequency of the interleaved PFC converter circuit is greater than the first switching frequency $f_{sw\_1}$ but less than the second switching frequency $f_{sw\_2}$. The phase-shift angle θ may be set at the first phase shift $θ_A$ when the switching frequency of interleaved the PFC converter circuit is greater than the second switching frequency $f_{sw\_2}$. Embodiments of the disclosure can suppress the $m^{th}$ and lower harmonic currents by operating the interleaved PFC converter with the first phase-shift angle $θ_A$ and with the second phase-shift angle $θ_B$, thereby reducing the differential mode (DM) EMI of the interleaved PFC converter. Various inventive embodiments are described herein, including methods, processes, systems, devices, and the like.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

FIG. 1 shows a schematic of a multi-phase interleaved PFC converter 100 controlled with hybrid phase-shift control method, according to some embodiments. In a PFC converter, the phase-shift angle (θ) is defined as the phase-shift between the sinusoidal AC power supply voltage and current. The multi-phase interleaved PFC converter 100 can include several (m) channels that are coupled in parallel. The multi-phase interleaved PFC converter 100 can include a bridge rectifier 102 coupled to an AC input line 104 and an input capacitor Cin. The multi-phase interleaved PFC converter 100 can include a plurality of PFC inductors $L_1$, $L_2$, ..., $L_m$, a plurality of switches $S_{w1}$, $S_{w2}$, ..., $S_{wm}$ coupled to each corresponding PFC inductor, and a plurality of freewheeling diodes $D_1$, $D_2$, ..., $D_m$ coupled to each corresponding switch.

The outputs terminals of each of the freewheeling diodes $D_1$, $D_2$, ..., $D_m$ can be connected together and coupled to a load $R_L$ and an output capacitor Cout. Currents flowing through each PFC inductor are denoted as $i_{L1}$, $i_{L2}$, ..., and $i_{Lm}$. $I_{in}$ denotes a total current flowing into the multi-phase interleaved PFC converter 100, i.e., $I_{in}=i_{L1}+i_{L2}+\ldots+i_{Lm}$. In some embodiments, the plurality of switches can be silicon based MOS transistors. In various embodiments, the plurality of switches can be silicon carbide based MOS transistors.

In some embodiments, the plurality of switches can be gallium nitride (GaN) based switches.

In current approaches, in a multi-phase interleaved PFC converter the phase-shift angle θ may be fixed at 360°/m, where m is the number of channels of the PFC converter. For example, in a two-phase interleaved PFC converter m=2, in current approaches the phase-shift angle θ may be fixed at 360°/2=180°. Embodiments of the disclosure enable varying the phase-shift angle θ of the interleaved PFC converter such that a ripple of the input current $I_{in}$ may be reduced, and such that a Fourier decomposition of $I_{in}$ may not have odd harmonics. By not having odd numbered harmonics, the differential mode (DM) noise current of the interleaved PFC converter can be reduced. In this way, the interleaved PFC converter can use a differential mode inductor that may have relatively small volume, thereby improving the power density of the PFC converter and save system costs.

In current approaches, methods for controlling a PFC converter operating in a critical conduction mode (CrM) may include constant on-time (COT) control methods. In a line voltage cycle, a switching frequency of the PFC converter is not fixed and can change continuously with a change of the amplitude of the line voltage. In current approaches the switching frequency of the PFC converter ($f_{sw}$) may be continuously changing, and the control method of fixing the phase-shift angle θ at 360°/m cannot substantially reduce the differential mode noise of the PFC converter.

The inductor current $i_L$ of the interleaved PFC converter may be a continuous periodic function and the expansion of its Fourier series is given by:

$$i_L(\omega t) = a_0 + \sum_{n=1}^{\infty} a_n \cos(n\omega t) + \sum_{n=1}^{\infty} b_n \sin(n\omega t) \quad (1)$$

where $a_0$, $a_n$, and $b_n$ are respectively:

$$a_0 = \frac{1}{2\pi} \int_0^{2\pi} u(\omega t) d(\omega t) \quad (2)$$

$$a_n = \frac{1}{\pi} \int_0^{2\pi} u(\omega t) \cos n\omega t \, d(\omega t)$$

$$b_n = \frac{1}{\pi} \int_0^{2\pi} u(\omega t) \sin n\omega t \, d(\omega t)$$

where ω=2πfs, and n=1, 2, 3 . . .

When the phase-shift angle of the inductor current $i_L$ is θ, the expansion of its Fourier series is:

$$i_L(\omega t + \theta) = a_0 + \sum_{n=1}^{\infty} a_n \cos n(\omega t + \theta) + \sum_{n=1}^{\infty} b_n \sin n(\omega t + \theta) \quad (3)$$

For a two-phase interleaved PFC converter (m=2), the input current is $I_{in}=i_{L1}+i_{L2}$, and the expansion of its Fourier series is:

$$i_{in}(\omega t) = i_L(\omega t) + i_L(\omega t + \theta) = \quad (4)$$

$$2a_0 + \sum_{n=1}^{\infty} a_n(\cos(n\omega t) + \cos n(\omega t + \theta)) + \sum_{n=1}^{\infty} b_n(\sin(n\omega t) + \sin n(\omega t + \theta)) =$$

-continued $$2a_0 + \sum_{n=1}^{\infty} 2a_n(\cos n(\omega t + \frac{\theta}{2})\cos(n\frac{\theta}{2})) + \sum_{n=1}^{\infty} 2b_n(\sin n(\omega t + \frac{\theta}{2})\cos(n\frac{\theta}{2}))$$

It can be derived from equation (4) that the Fourier series expansion of the input current $I_{in}$ includes $\cos(n*\theta/2)$. Therefore, when the phase-shift angle $\theta=180°$, the expansion of the Fourier series may not include odd harmonics, and the proportion of the $2^{nd}$ harmonic can be the largest contributor. When the phase-shift angle $\theta=90°$, the amplitude of the $2^{nd}$ harmonic is 0, but the amplitudes of the 1st harmonic and the 3rd harmonic are not 0. Similarly, for an m-phase interleaved PFC converter, when the phase-shift angle $\theta=360°/m$, the expansion of the Fourier series may only include m*n harmonics, and the proportion of $m^{th}$ harmonics is the largest. When the phase-shift angle $\theta=360°/m^2$, the amplitude of the $m^{th}$ harmonic is 0, but the amplitude of the $(m\pm1)th$ harmonic current is not 0.

According to the EMC electromagnetic compatibility test standard CISPR22, the frequency test range of conducted EMI is 150 kHz to 30 MHz. Thus, if the frequency of a certain harmonic current of the input current $I_{in}$ is lower than 150 kHz, the harmonic current of this frequency is not within the frequency test range of conducted EMI. Therefore, this harmonic current may not cause conducted EMI problems. In various embodiments, a method for hybrid phase-shift control of interleaved PFC converter can substantially suppress the differential mode noise (DM EMI) of the interleaved PFC.

In some embodiments, the phase-shift angle of the interleaved PFC converter may not be fixed. As the switching frequency of the interleaved PFC converter changes, its phase-shift angle $\theta$ may be changed correspondingly. In various embodiments, the switching frequency $f_{sw}$ of the interleaved PFC converter may have two different frequency thresholds, i.e., a first switching frequency $f_{sw\_1}$ and a second switching frequency $f_{sw\_2}$. In some embodiments, the phase-shift angle $\theta$ of the interleaved PFC converter may include a first phase-shift angle $\theta_A$ and a second phase-shift angle $\theta_B$. Embodiments of the disclosure can substantially suppress the $m^{th}$ and lower harmonic currents by using control methods utilizing the first phase-shift angle $\theta_A$ and the second phase-shift angle $\theta_B$, thereby reducing the differential mode noise (DM EMI) of the interleaved PFC converter.

The first switching frequency $f_{sw\_1}$, the second switching frequency $f_{sw\_2}$, the first phase-shift angle $\theta_A$, and the second phase-shift angle $\theta_B$ may be expressed as:

$$f_{sw\_1} = \frac{150 \text{ kHz}}{m-1}$$

$$f_{sw\_2} = \frac{150 \text{ kHz}}{m}$$

$$\theta_A = \frac{360°}{m}$$

$$\theta_B = \frac{360°}{m^2}$$

where m is a total number of channels of the interleaved PFC converter, and m≥2.

Figure 2:
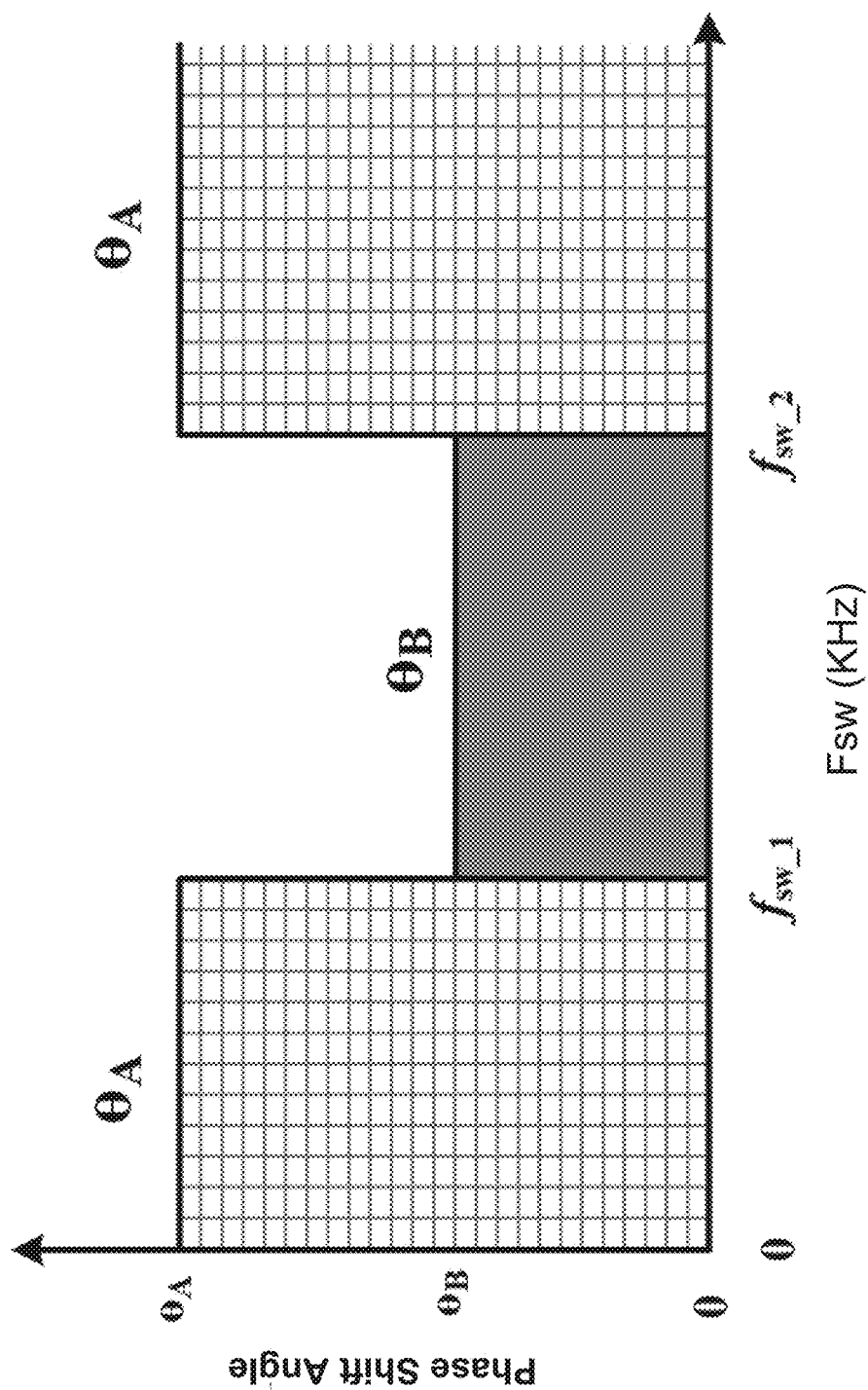
FIG. 2 shows a graph for selecting a phase-shift angle θ of the interleaved PFC converter of FIG. 1, according to some embodiments.

In some embodiments, a phase-shift angle $\theta$ can be selected according to a switching frequency of the interleaved PFC converter, as shown in FIG. 2. As shown in FIG. 2, when the switching frequency of the PFC converter exceeds the first switching frequency $f_{sw\_1}$ ($f_{sw} \geq f_{sw\_1}$) the phase-shift angle $\theta$ of the interleaved PFC converter can be arranged to be at a first phase-shift angle $\theta_A$ ($\theta=\theta_A$). Under this operating condition, the switching frequency of the interleaved PFC converter may be relatively high, and the frequency of the (m−1)th harmonic current can appear the test range of conducted EMI (150 kHz to 30 MHz). By setting the phase-shift angle $\theta=\theta_A$, disclosed methods can cause the amplitude of the $(m-1)^{th}$ harmonic current to be 0, thus the lowest frequency harmonic current detected by an EMI receiver may be the $m^{th}$ harmonic current.

When the switching frequency of the PFC converter exceeds the second switching frequency $f_{sw\_2}$ but is lower than the first switching frequency $f_{sw\_1}$ ($f_{sw\_2} \leq f_{sw} < f_{sw\_1}$), the phase-shift angle $\theta$ of the interleaved PFC converter may be set to the second phase-shift angle $\theta_B$ ($\theta=\theta_B$). Under this operating condition, the switching frequency of the interleaved PFC converter may be relatively low, and the frequency of the $(m-1)^{th}$ harmonic current may less than 150 kHz. By setting the phase-shift angle $\theta=\theta_B$ can cause the amplitude of the $m^{th}$ harmonic current to be 0, and the EMI receiver may not detect the $(m-1)^{th}$ harmonic current. The lowest frequency harmonic current detectible may be the (m+1)th harmonic current.

When the switching frequency of the PFC converter is lower than the second switching frequency $f_{sw\_2}$ ($f_{sw} < f_{sw\_2}$), the phase-shift angle $\theta$ of the interleaved PFC converter may be set to the first phase-shift angle $\theta_A$ ($\theta=\theta_A$). Under this operating condition, the switching frequency of the interleaved PFC converter is relatively very low, and by setting the phase-shift angle $\theta=\theta_A$ can substantially reduce the differential mode noise (DM EMI) of the interleaved PFC converter.

Figure 4:
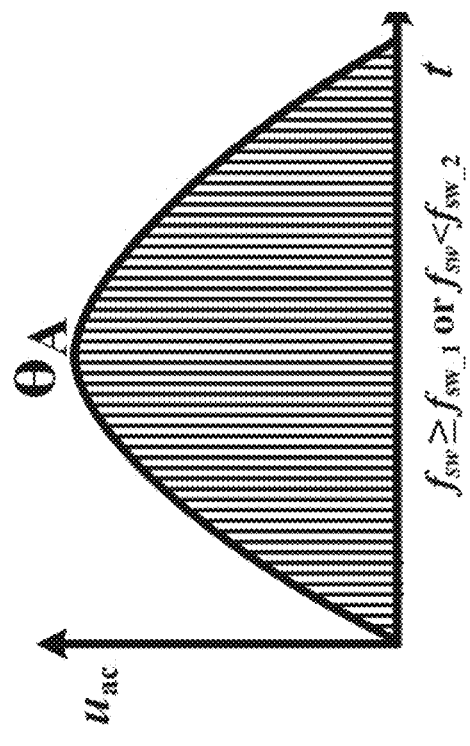
FIG. 4 shows setting the phase-shift angle of the interleaved PFC converter of FIG. 1 to a second phase-shift angle when the switching frequency is completely between a first switching frequency and a second switching frequency, according to some embodiments.
Figure 3:
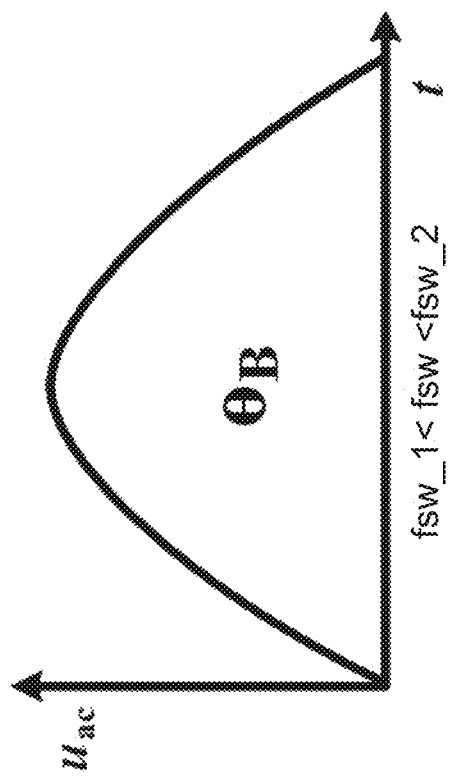
FIG. 3 shows setting the phase-shift angle of the interleaved PFC converter of FIG. 1 to a first phase-shift angle when the switching frequency is higher than a first switching frequency or is lower than a second switching frequency, within half a line voltage cycle, according to some embodiments.
Figure 5A:
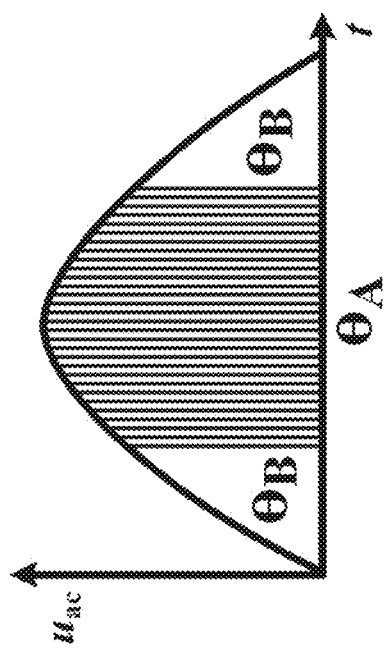
FIGS. 5A-5D show continuously changing the phase-shift angle of the interleaved PFC converter of FIG. 1 when there may be several operating conditions where the switching frequency changes with the amplitude of the line voltage, according to some embodiments.
Figure 5B:
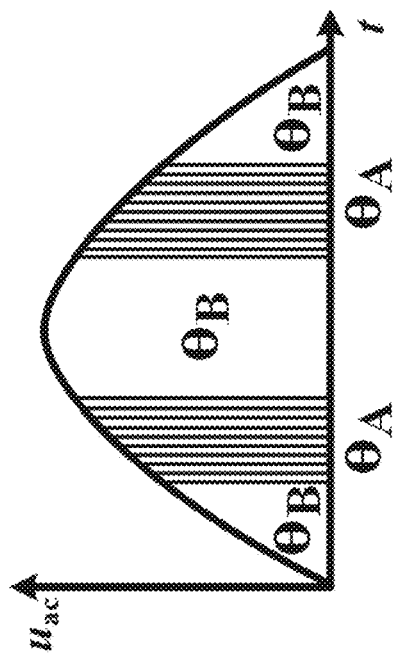
Figure 5C:
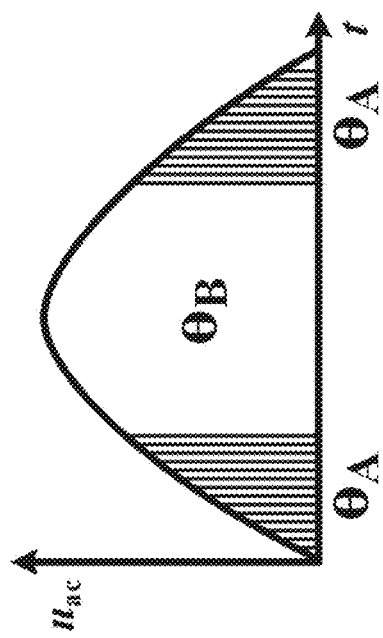
Figure 5D:
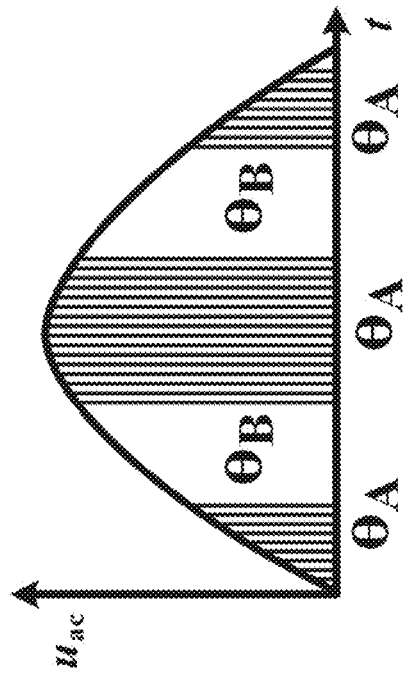

When the interleaved PFC converter is operating in the critical conduction mode, its switching frequency may change continuously with the amplitude of the line voltage. Within half a line voltage cycle, when the switching frequency $f_{sw}$ is higher than the first switching frequency $f_{sw\_1}$ or is lower than the second switching frequency $f_{sw\_2}$, then the phase-shift angle $\theta$ may be set to the first phase-shift angle $\theta_A$, as shown in FIG. 3. When the switching frequency $f_{sw}$ is completely between the first switching frequency $f_{sw\_1}$ and the second switching frequency $f_{sw\_2}$, then the phase-shift angle within half a line voltage cycle may be set to second phase-shift angle $\theta_B$, as shown in FIG. 4.

In some embodiments, when there may be several operating conditions where the switching frequency $f_{sw}$ changes with the amplitude of the line voltage, then the phase-shift angle $\theta$ within half a line voltage cycle may be continuously changed, as shown in FIGS. 5A-5D.

Example 1

The present invention will now be more fully described with reference to the accompanying examples. It should be understood, however, that the following description is illustrative only and should not be taken in any way as a restriction of the invention.

This embodiment includes application of disclosed methods to a two-phase interleaved PFC converter with a rated power of 300 W, an input voltage of 115 Vac, and an operating mode of critical conduction mode (CRM). When a line voltage rises from 0 V to 163 V, the switching frequency of the two-phase interleaved PFC converter drops from 300 kHz to 90 kHz. Disclosed embodiments include control methods having a first switching frequency $f_{sw\_1}$, a second switching frequency $f_{sw\_2}$, a first phase-shift angle $\theta_A$, and a second phase-shift angle $\theta_B$. In this embodiment m=2, and the first switching frequency $f_{sw\_1}$, the second switching frequency $f_{sw\_2}$, the first phase-shift angle $\theta_A$ and the second phase-shift angle $\theta_B$ can be respectively calculated as:

$$f_{sw\_1} = \frac{150 \text{ kHz}}{m-1} = 150 \text{ kHz}$$

$$f_{sw\_2} = \frac{150 \text{ kHz}}{m} = 75 \text{ kHz}$$

$$\theta_A = \frac{360°}{m} = 180°$$

$$\theta_B = \frac{360°}{m^2} = 90°$$

In current approaches, in two-phase interleaved PFC converter, the phase-shift angle θ may be fixed at 180°. Therefore, when the switching frequency of the interleaved PFC converter drops from 300 kHz to 90 kHz, the phase-shift angle θ remains unchanged. Embodiments of the disclosure includes control methods where the phase-shift angle θ may be changed corresponding to changes in the switching frequency. When the switching frequency of the interleaved PFC converter is 90 kHz to 150 kHz, the phase-shift angle θ can be set to be 90°. When the switching frequency of the interleaved PFC converter is 150 kHz to 300 kHz, the phase-shift angle θ can be set to be 180°. At a switching frequency of $f_{sw}$=200 kHz, the magnitude of the first harmonic current is 0, and the lowest frequency harmonic current that can be detected by in EMI tester may be the second harmonic current, i.e., 400 kHz.

At a switching frequency of $f_{sw}$=100 kHz, the amplitude of the first harmonic current may not be zero, however the frequency of the first harmonic current is out of the EMI test frequency range. Therefore, the EMI receiver cannot detect the first harmonic current. However, the amplitude of the second harmonic current is 0, and the lowest frequency harmonic current that can be detected by the EMI receiver is the third harmonic current, i.e., the harmonic current of 300 kHz.

Figure 6:
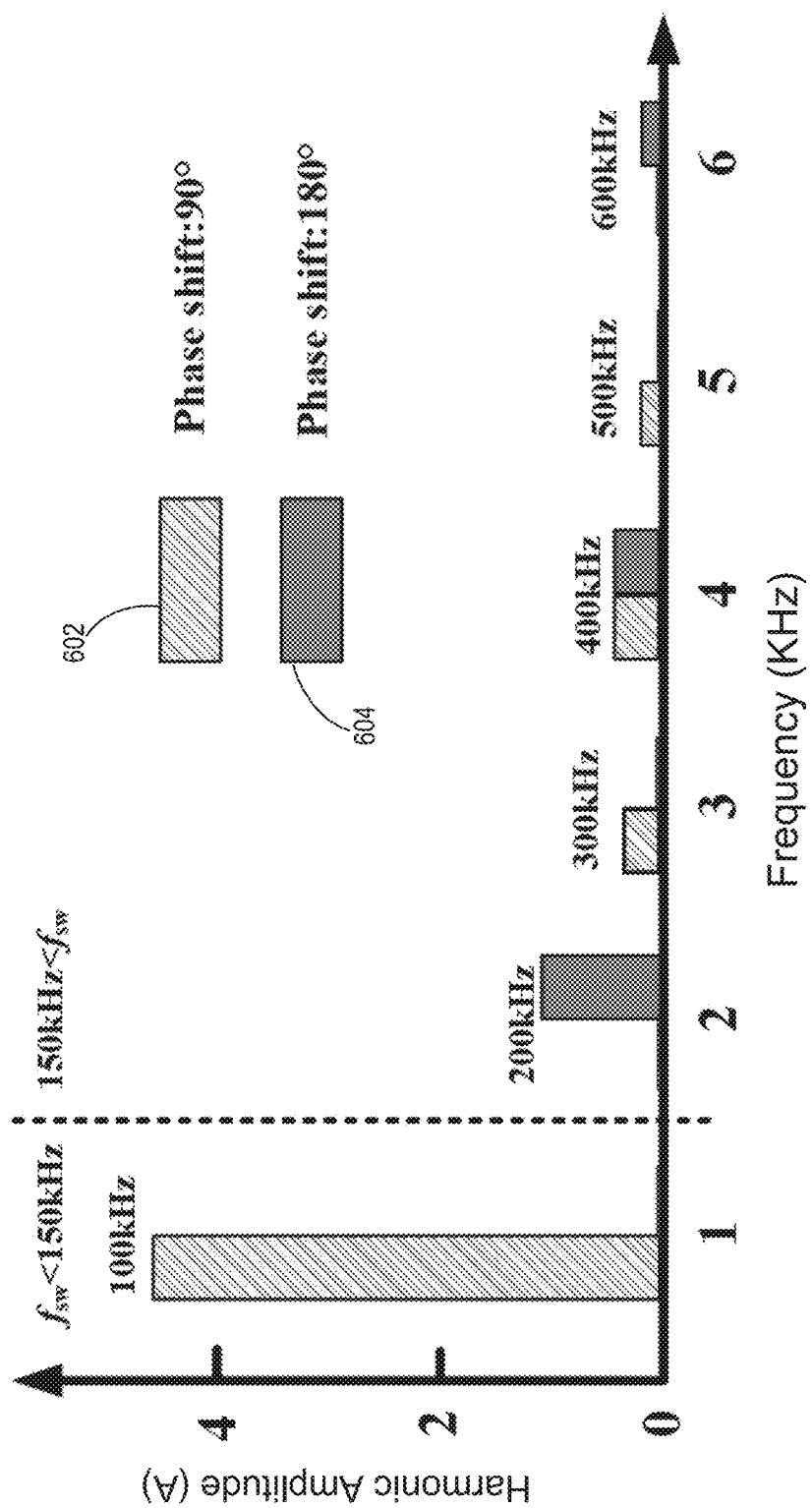
FIG. 6 shows Fourier decomposition results of the input current $I_{in}$ in current approaches as compared to Fourier decomposition results of the input current $I_{in}$ of the interleaved PFC converter of FIG. 1, according to disclosed embodiments.

FIG. 6 shows Fourier decomposition results of the input current $I_{in}$ in current approaches as compared to Fourier decomposition results of the input current $I_{in}$ according to disclosed embodiments. FIG. 6 shows harmonic amplitude as a function of frequency (Fourier order). The hatched bars 602 show results of disclosed embodiments, while the solid bars 604 shows results of current approaches. In the illustrated example, the switching frequency of a two-phase interleaved PFC converter is $f_{sw}$ 100 kHz, and the duty ratio D=0.4. As can be seen in FIG. 6, for current approaches an amplitude of the first harmonic current is 0, while the amplitude of the second harmonic current is at 200 kHz and has a relatively high amplitude. Results of disclosed hybrid phase-shift control methods shows that while an amplitude of the first harmonic current may not be zero, its frequency is at 100 kHz, which is out of the differential mode EMI testing range. Also, an amplitude of the second harmonic current is 0 and an amplitude of the third harmonic current is relatively smaller than the amplitude of the second harmonic current from current approaches. Thus, disclosed embodiments can substantially suppress the differential mode noise of the interleaved PFC converter.

Figure 7:
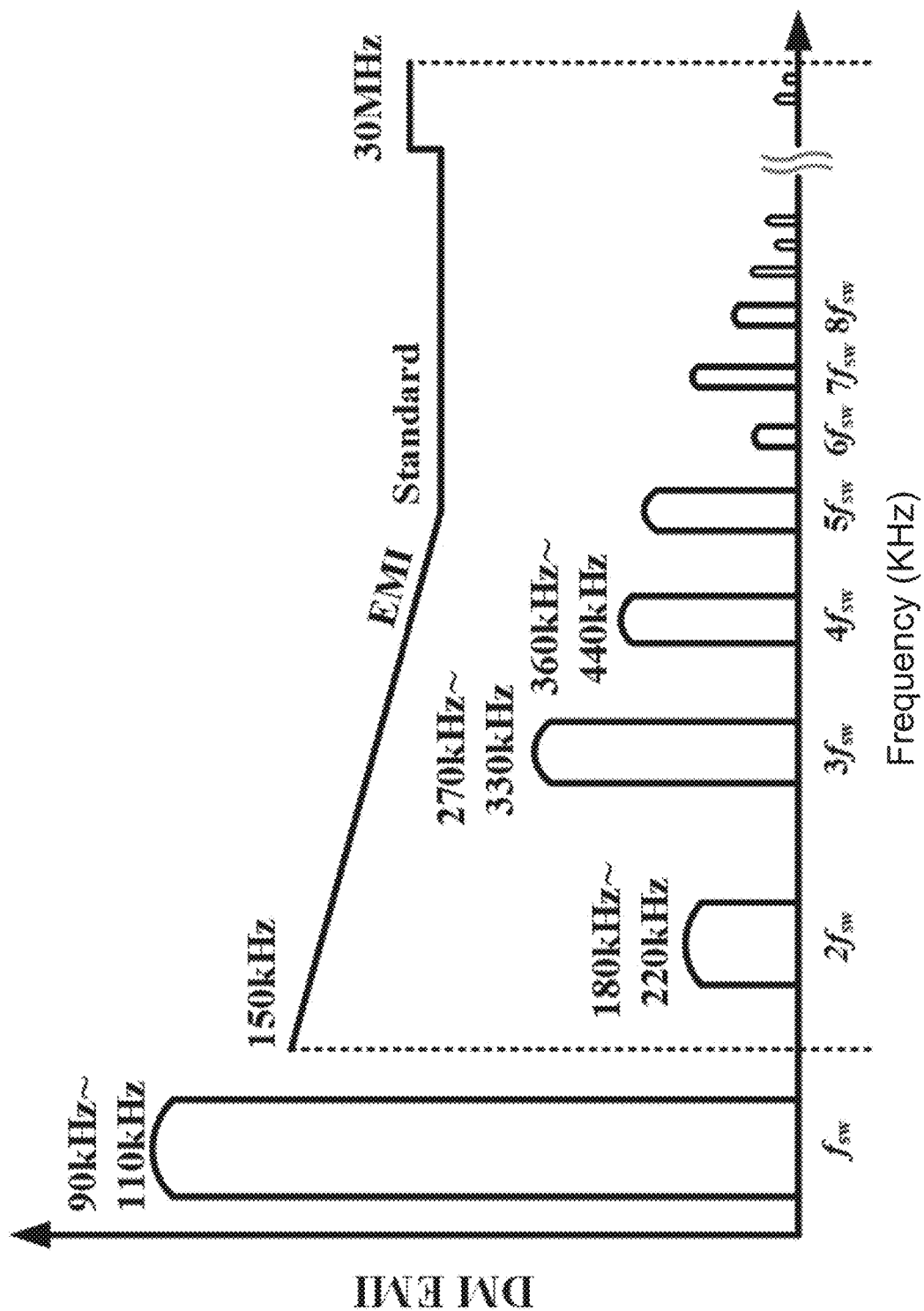
FIG. 7 shows EMI test results for an interleaved PFC converter and its operating method, according to certain embodiments.

FIG. 7 shows EMI test results for an interleaved PFC converter and operating method, according to certain embodiments. In the illustrated example, when the switching frequency is 150 kHz to 300 kHz, the phase-shift angle θ is set at 180°, and when the switching frequency is 90 kHz to 150 kHz, the phase-shift angle θ is set at 90°. It can be seen from FIG. 7 that when the frequency of DM EMI is 90 kHz to 110 kHz, the amplitude of DM EMI is the highest compared to the other shown frequencies, however this frequency range, i.e., 90 kHz to 110 kHz is not within the EMI test range, therefore it does not affect the results of EMI testing. As can be seen, for the frequency range of 180 kHz to 220 kHz, the amplitude of DM EMI is relatively very low. Further, for the frequency range of 270 kHz to 330 kHz the amplitude of DM EMI may be relatively higher than at the other test frequencies, but it is well within the acceptable EMI test limits. Moreover, the test results at the other frequencies are also well within the acceptable EMI test limits. Therefore, disclosed embodiments can substantially reduce the amplitude of the differential mode noise of interleaved PFC converters. In this way, power density of the interleaved PFC converters can be improved.

In some embodiments, combination of the circuits and methods disclosed herein can be utilized for operating interleaved PFC converters. Although circuits and methods are described and illustrated herein with respect to several particular configuration of an interleaved PFC converter, embodiments of the disclosure are suitable for controlling and operating other power converter topologies, such as, but not limited to, flyback and LLC converters.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom" or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A method of operating a circuit, the method comprising:
    providing an interleaved power factor correction (PFC) converter circuit;
    determining a switching frequency of the interleaved PFC converter circuit;
    setting a phase shift of the interleaved PFC converter circuit at a first phase shift when the switching frequency of the interleaved PFC converter circuit is below or at a first switching frequency;
    setting the phase shift of the interleaved PFC converter circuit at a second phase shift when the switching frequency of the interleaved PFC converter circuit is greater than the first switching frequency but less than a second switching frequency; and
    setting the phase shift of the interleaved PFC converter circuit at the first phase shift when the switching frequency of interleaved the PFC converter circuit is greater than the second switching frequency.

2. The method of claim 1, wherein the interleaved PFC converter circuit comprises m channels that are coupled in parallel.

3. The method of claim 2, wherein m is equal to 2.

4. The method of claim 3, further comprising determining the first switching frequency by dividing 150 kHz by m.

5. The method of claim 4, further comprising determining the second switching frequency by dividing 150 kHz by m−1.

6. The method of claim 5, further comprising determining the first phase shift by dividing 360° by m.

7. The method of claim 6, further comprising determining the second phase shift by dividing 360° by $m^2$.

8. The method of claim 2, wherein m is greater than 2.

9. The method of claim 1, wherein the interleaved PFC converter circuit comprises gallium nitride (GaN) based switches.

10. The method of claim 1, wherein the interleaved PFC converter circuit comprises silicon-based or silicon carbide based switches.

11. A circuit comprising:
    an interleaved power factor correction (PFC) converter circuit, the interleaved PFC converter circuit arranged to:
        determine a switching frequency of the interleaved PFC converter circuit;
        set a phase shift of the interleaved PFC converter circuit at a first phase shift when the switching frequency of the interleaved PFC converter circuit is below or at a first switching frequency;
        set the phase shift of the interleaved PFC converter circuit at a second phase shift when the switching frequency of the interleaved PFC converter circuit is greater than the first switching frequency but less than a second switching frequency; and
        set the phase shift of the interleaved PFC converter circuit at the first phase shift when the switching frequency of interleaved the PFC converter circuit is greater than the second switching frequency.

12. The circuit of claim 11, wherein the interleaved PFC converter circuit comprises m channels that are coupled in parallel.

13. The circuit of claim 12, wherein m is equal to 2.

14. The circuit of claim 13, wherein the interleaved PFC converter circuit is further arranged to determine the first switching frequency by dividing 150 kHz by m.

15. The circuit of claim 14, wherein the interleaved PFC converter circuit is further arranged to determine the second switching frequency by dividing 150 kHz by m−1.

16. The circuit of claim 15, wherein the interleaved PFC converter circuit is further arranged to determine the first phase shift by dividing 360° by m.

17. The circuit of claim 15, wherein the interleaved PFC converter circuit is further arranged to determine the second phase shift by dividing 360° by $m^2$.

18. The circuit of claim 12, wherein m is greater than 2.

19. The circuit of claim 11, wherein the interleaved PFC converter circuit comprises gallium nitride (GaN) based switches.

20. The circuit of claim 11, wherein the interleaved PFC converter circuit comprises silicon-based or silicon carbide based switches.

* * * * *